April 7, 1936.  R. REINBOLD  2,036,540
DANDELION COLLECTOR
Filed Dec. 7, 1934
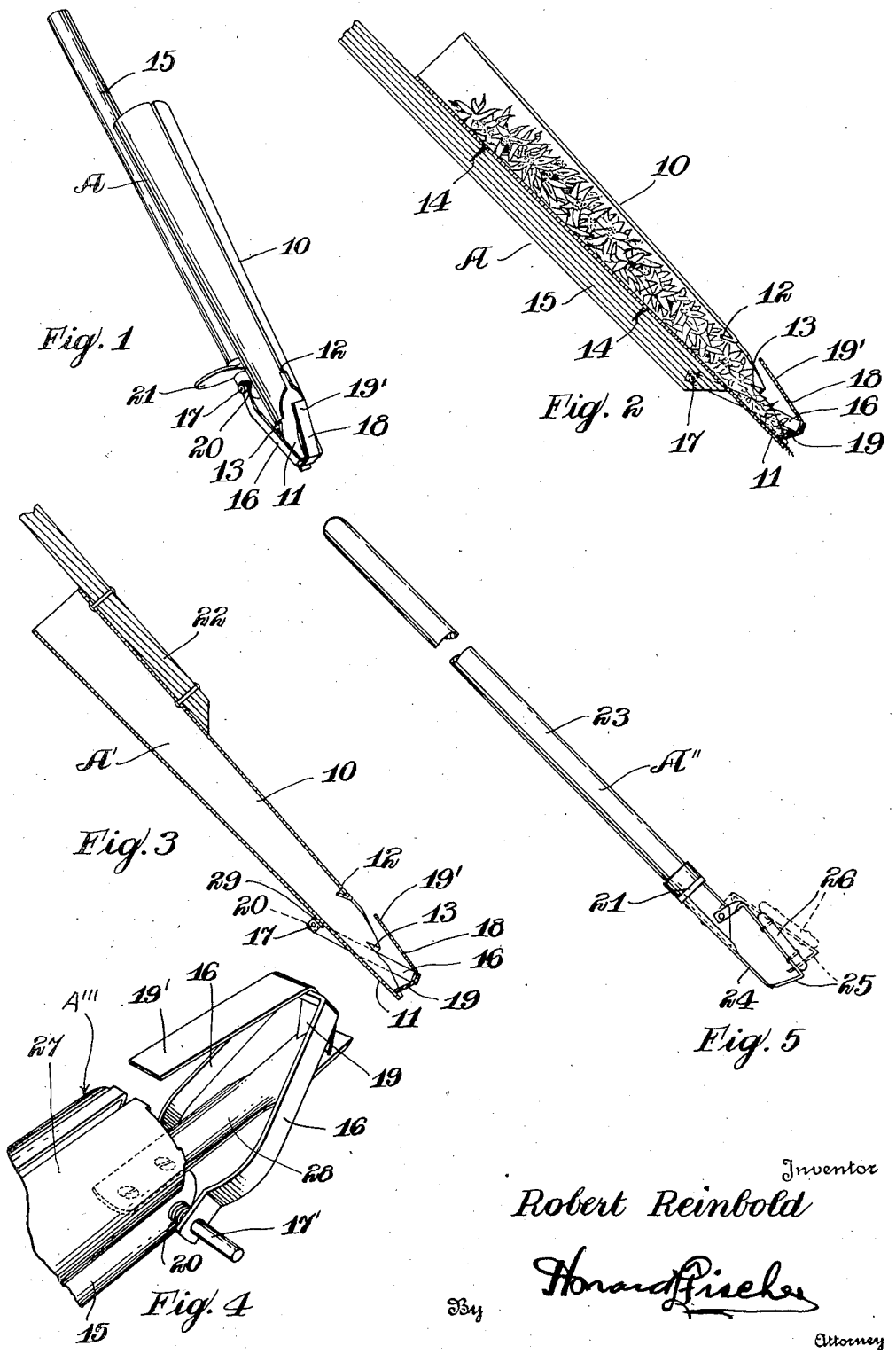
Inventor
Robert Reinbold
By Howard Fischer
Attorney Patented Apr. 7, 1936

2,036,540

UNITED STATES PATENT OFFICE 2,036,540

DANDELION COLLECTOR

Robert Reinbold, St. Paul, Minn.

Application December 7, 1934, Serial No. 756,453

8 Claims. (Cl. 55—65)

My invention relates to a dandelion collector which is designed to cut the root of the dandelion by insertion into the ground far enough to cut off the main root in a forward motion, and by a retracting or pulling motion of the dandelion collector, the dandelion leaves are engaged at the head of the root and pulled easily from the ground.

A feature resides in providing a suitable cutter which is inserted into the ground, which may be urged by a foot engageable member positioned on the lower end of the collector so that the foot pressure may be used in forcing the cutting member or blade into the ground to the root.

A further object of my invention is to provide a dandelion collector having means which automatically raises upon the insertion of the cutting member or blade into the ground and on which a claw end is formed so that this member automatically engages the head and the leaves of the dandelion as the dandelion collecting tool is pulled out of the ground after cutting the roots, thereby collecting and pulling the dandelion from the ground, holding the pulled dandelion between the rigidly positioned cutting blade portion and the movable claw portion.

My invention further includes a means of guiding the pulled dandelion from the pulling claw and cutting blade portion longitudinally of the collector so that a number of pulled dandelions can be collected as they are pulled, and held by the dandelion collector.

A feature of primary importance is to provide a dandelion collector having a simple construction wherein a dandelion receiving and collecting tube is provided so that as the roots of the dandelions are cut off and the automatic claw engages the leafy heads of the same to pull the dandelions from the ground, the pulled dandelion is guided by the guide means to the dandelion receiving tube which provides a receptacle for supporting a comparatively large number of pulled dandelions. Thus, my dandelion collector provides an efficient means, having a convenient character which does not require another receptacle to be carried about, but permits the dandelion collector to cut, pull, and collect the dandelions into the receptacle until the receptacle is filled, and then the same may be emptied by turning it upside down or on end and if necessary striking the end of the handle of the dandelion collector on the ground, whereupon all of the collected dandelions will readily be discharged from the enlarged end of the collecting tube or receptacle.

A certain form of receptacle is illustrated which includes means for holding the dandelions from slipping back toward the cutting blade and automatic pulling claw and guide means when the pulled dandelions enter the receptacle tube. It is apparent, however, that the receptacle may be of any suitable nature, formed in a manner so that the dandelions will automatically enter into the same after they are pulled and pushed in by other dandelions which are pulled, moving the pulled dandelions primarily by the forward movement of the cutting blade into the ground, thus providing a suitable receptacle of any character which will not make it necessary to carry about an extra receptacle for receiving the pulled dandelions, and permitting the operator to collect the dandelions pulled in the collector in a manner so that they can be discharged when a large number of the same have accumulated in the receptacle.

The features and objects will be more fully pointed out and exemplified in the further specification and claims.

In the drawing forming part of this specification:

Figure 1 illustrates a form of my dandelion collector with a portion of the operating handle cut away.

Figure 2 is a longitudinal section of my dandelion collector shown in Figure 1, with a portion of the handle cut away, and the same being enlarged to more clearly show the operating parts.

Figure 3 illustrates another form of my dandelion collector, in a longitudinal section, with only a portion of the operating handle showing, being similar to the construction of Figures 1 and 2, excepting the receptacle hangs from the bottom of the operating handle.

Figure 4 is an enlarged detail perspective of the lower end of a form of my dandelion collector, showing the cutting blade which severs the root in the ground, the automatically operated pulling claw with the guiding means of the same as associated with the blade.

Figure 5 is a side elevation of my dandelion collector in a simple form with the root cutting blade projecting from the lower end of the operating handle, only a portion of which is shown, and the automatic collecting claw operated by a suitable weight member which normally holds the claw against the cutting blade.

As illustrated in Figures 1 and 2, my dandelion collector A is in the form of a tapered tube 10 of sheet metal or other suitable material, the lower extremity of which is cut away along its uppermost side to provide a projecting cutting blade 11. Pointed lips 12 and 13 are cut from the body of the tube 10, and are bent inwardly and rearwardly, as illustrated in Figure 2, to prevent dandelions within the tube 10 from sliding out through the lower end of the tube 10.

The tube 10 is attached by suitable screws 14, bolts, or any other suitable means, to the handle 15, which in the form illustrated in Figures 1 and 2, extends beneath the tube 10. The handle in preferred form is longer than the tube 10, and extends to a sufficient length that it may readily be held in the hands of the operator.

A U-shaped yoke 16 is pivoted to the handle 15 by means of a pivot pin 17 which extends through the handle 15 and through both of the ends of the yoke 16. The yoke 16 extends on either side of the blade end of the tube 10, and to the closed end of the U-shaped yoke is secured a dandelion collecting claw and guide means 18. This claw and guide means 18 comprises a toothed end 19 which normally rests against the upper surface of the blade 11, and a guide end 19' which extends substantially parallel to the upper side of the tube 10, or in line therewith, to guide the dandelions B into the tube 10. A spring 20 on the pivot pin 17 holds the claw and guide means normally against the blade 11.

If it is desired, a suitable foot engaging member 21 may be provided on the handle 15, as illustrated in Figures 1 and 5, so that the cutter blade 11 may be forced into the ground by foot pressure.

In operation, the blade 11 is forced into the ground by means of the handle 15 or by the use of the foot engaging member 21 at an angle and at a slight distance from the dandelion, in such a manner that the blade 11 will cut off the root of the dandelion at a point substantially beneath the surface of the ground. During the insertion of the blade 11, the claw 18 slides outwardly from the handle and blade along the surface of the ground, against the tension of the spring 20. As the blade is withdrawn, the claw 18 slides back along the ground toward the blade 11, engaging beneath the upper portion of the dandelion B to pull this portion of the dandelion and the cut upper portion of the root bodily from the ground. As the blade 11 is again forced into the ground, the dandelion previously pulled will be forced upwardly along the blade 11 and into the tube 10, where it is held from downward movement by the lips 12 and 13. When the tube 10 becomes full, the dandelions may be removed by turning the collector A upside down to rest the handle 15 upon the ground, tapping the handle on the ground if necessary to remove all of the dandelions.

The form of construction illustrated in Figure 3 is similar to that illustrated in Figure 2, with the exception that in Figure 3, the collector A' is provided with a handle 22 which is secured to the upper side of the tube 10 rather than to the lower side thereof. It may be seen that in this modified form, the tube is suspended from the handle, rather than supported on the upper surface of the handle. This modification has the advantage of supporting the dandelion collecting tube 10 in such a manner that the tube 10 has no tendency to rotate the handle 15 in the hands of the operator when it becomes heavy with dandelions, but must be made sufficiently strong so that the strain of the insertion of the blade and the removal of the dandelion may be transmitted through the body of the tube 10. In this form, the yoke 16 is pivoted to a suitable bracket 29 on the tube 10.

In the construction A" illustrated in Figure 5, the tube 10 is omitted. The handle 23 is provided with a blade 24 secured at the lowermost extremity thereof. A guide and claw 25 is pivoted to the handle 23, and is held pivoted against the blade 24 by means of the weight 26. When the blade 24 is inserted into the ground, the guide and claw 25 pivots as illustrated by the dotted position thereof in Figure 5. While no tube 10 is provided, several dandelions may be contained between the blade 24 and the claw 25, and will actually remain packed in this position until this space is filled.

In the alternate construction A''' illustrated in Figure 4, the tube 27 is substantially square ended, and a separate blade 28 is provided in the place of the integral blade of Figures 1 and 2. The blade 28 is secured through the tube 27 to the handle 15, as illustrated in Figure 4. In this modification, the pivot pin is provided with extended ends 17' which may be engaged by the foot to force the blade 28 into the ground.

I have described the principles of construction and operation of my dandelion collector, and while I have endeavored to set forth the best embodiment thereof, I desire to have it understood that this is only a means of carrying out my invention, and that obvious changes could be made within the scope of the following claims without departing from the spirit of the invention.

I claim:

1. A dandelion collector including, a handle, a root cutting blade secured in fixed relation to said handle, an automatically operated collecting claw, means for guiding the pulled dandelion longitudinally of the blade when engaged by the claw and forced by the insertion of the blade in the cutting of the roots of the next dandelion, and a receptacle for receiving the pulled dandelions to collectively support the same until it is desired to empty the receptacle.

2. A dandelion collector including, an operating handle, a root cutting blade secured in fixed relation to said handle, an automatically operable claw which recedes as the blade is inserted into the ground and which engages the leafy heads of the roots of the dandelion and pulls the dandelions from the ground as the collector is pulled away from the ground, and a receptacle for receiving the pulled dandelions.

3. A dandelion puller and collector including, a root severing blade, a pivoted claw adapted to recede away from said blade as the blade is inserted in the ground, foot engaging means for urging the blade into the ground, and a receptacle having an open discharge end for receiving the pulled dandelions to collect the same until it is desired to empty the receptacle.

4. A dandelion puller including, an operating handle, a root severing blade secured in fixed relation to said handle, a pivoted claw and guide means, means for holding said claw normally against said blade, and a receptacle for receiving the pulled dandelions adapted to extend longitudinally along said operating handle.

5. A dandelion puller and collector comprising, a member for severing the root of the dandelion below the ground level, a collecting claw pivotally supported in a position to easily move up from the blade to permit the blade to cut up the root of the dandelion in a forward downward movement of the collector, said claw automatically engaging the leafy head of the dandelion and pulling it from the ground, guide means associated with said blade and said claw to force the pulled dandelion longitudinally of the collector when another dandelion is severed at the root, a receptacle for receiving the pulled dandelion, and a discharge opening formed in one end of said receptacle to permit the same to be dumped when it is desired.

6. A dandelion and the like collector, comprising, an operating handle, a tubular receptacle, a root severing end formed on said receptacle, an automatically operable claw normally engaging the root severing end formed on said receptacle, and means for guiding pulled dandelions into said receptacle in the digging and collecting operation of said collector.

7. A dandelion and weed collector including, an operating handle portion, a tubular receptacle dandelion and weed receiving portion, a cutting blade portion, and an automatically operable collecting claw portion which operates to pull and guide the weeds into said receptacle portion.

8. A weed and dandelion collector including, a tubular receptacle weed collecting portion, blade means for cutting the roots of the weed, an automatically operable claw means for collecting the weeds when cut having guide means for forcing the weeds into the receptacle in the operation of cutting and collecting the weeds.

ROBERT REINBOLD.